United States Patent
Wang

(10) Patent No.: US 11,373,161 B2
(45) Date of Patent: Jun. 28, 2022

(54) POST-PAID TRANSACTION DATA PROCESSING METHOD AND DEVICE, PROCESSING APPARATUS, AND SERVER

(71) Applicant: Advanced New Technologies Co., Ltd., Grand Cayman (KY)

(72) Inventor: Jun Wang, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/103,139

(22) Filed: Nov. 24, 2020

(65) Prior Publication Data

US 2021/0081922 A1 Mar. 18, 2021

Related U.S. Application Data

(63) Continuation of application No. PCT/CN2019/091092, filed on Jun. 13, 2019.

(30) Foreign Application Priority Data

Jul. 27, 2018 (CN) .......................... 201810841320.8

(51) Int. Cl.
*G06Q 20/24* (2012.01)
*G06Q 40/00* (2012.01)
(Continued)

(52) U.S. Cl.
CPC ............. *G06Q 20/24* (2013.01); *G06N 20/00* (2019.01); *G06Q 20/3678* (2013.01);
(Continued)

(58) Field of Classification Search
None
See application file for complete search history.

(56) References Cited

U.S. PATENT DOCUMENTS 6,999,943 B1* 2/2006 Johnson ................. G06Q 20/10
705/35
7,853,520 B2* 12/2010 Choudhuri ............. G06Q 40/02
705/38

(Continued)

FOREIGN PATENT DOCUMENTS

CN 101568937 A 10/2009
CN 103093379 A 5/2013
(Continued)

OTHER PUBLICATIONS

International Search Report in Application No. PCT/CN2019/091092, from the China National Intellectual Property Administration, dated Sep. 19, 2019.
(Continued)

*Primary Examiner* — Peter Ludwig
(74) *Attorney, Agent, or Firm* — Finnegan, Henderson, Farabow, Garrett & Dunner, LLP

(57) ABSTRACT

A post-paid transaction data processing method includes: receiving risk search information via a wireless or wired interface, the risk search information including a transaction amount and a transaction user identifier of a post-paid transaction; acquiring, according to the transaction user identifier, a payment channel corresponding to the transaction user identifier; determining a predictive affordable value of the payment channel for the transaction amount based on the payment channel and the transaction amount; and determining a default evaluation result of the post-paid transaction according to the predictive affordable value.

13 Claims, 9 Drawing Sheets

(51) Int. Cl.
  *G06Q 20/36* (2012.01)
  *G06Q 20/40* (2012.01)
  *G06Q 30/02* (2012.01)
  *G06Q 40/02* (2012.01)
  *G06N 20/00* (2019.01)

(52) U.S. Cl.
  CPC ..... *G06Q 20/4014* (2013.01); *G06Q 20/4016* (2013.01); *G06Q 20/4037* (2013.01); *G06Q 30/0201* (2013.01); *G06Q 40/02* (2013.01); *G06Q 40/12* (2013.12)

(56) References Cited

U.S. PATENT DOCUMENTS

| | | | | |
|---|---|---|---|---|
| 10,467,559 | B1* | 11/2019 | Svenson | G06Q 20/209 |
| 10,467,631 | B2* | 11/2019 | Dhurandhar | G06Q 20/102 |
| 10,943,311 | B1* | 3/2021 | Svenson | G06Q 20/20 |
| 2003/0026404 | A1* | 2/2003 | Joyce | G06Q 20/32 |
| | | | | 379/144.01 |
| 2003/0182230 | A1* | 9/2003 | Pessin | G06Q 40/025 |
| | | | | 705/39 |
| 2004/0111370 | A1* | 6/2004 | Saylors | G06Q 20/102 |
| | | | | 705/40 |
| 2005/0289039 | A1* | 12/2005 | Greak | G06Q 30/0609 |
| | | | | 705/37 |
| 2007/0063024 | A1* | 3/2007 | Guillot | G06Q 20/20 |
| | | | | 235/380 |
| 2007/0228156 | A1* | 10/2007 | Eckert | G06Q 20/20 |
| | | | | 235/380 |
| 2008/0033880 | A1* | 2/2008 | Fiebiger | G06Q 20/40 |
| | | | | 705/44 |
| 2008/0086403 | A1* | 4/2008 | Dilip | G06Q 20/40 |
| | | | | 705/35 |
| 2009/0210299 | A1* | 8/2009 | Cowen | G06Q 20/405 |
| | | | | 705/13 |
| 2009/0222379 | A1* | 9/2009 | Choudhuri | G06Q 40/025 |
| | | | | 705/38 |
| 2010/0106586 | A1* | 4/2010 | Etheredge | G06Q 30/0224 |
| | | | | 705/14.18 |
| 2011/0112869 | A1* | 5/2011 | Greak | G06Q 40/08 |
| | | | | 705/4 |
| 2011/0125565 | A1* | 5/2011 | MacIlwaine | G06Q 30/02 |
| | | | | 705/14.17 |
| 2011/0131130 | A1* | 6/2011 | Griffin | G06Q 40/00 |
| | | | | 705/38 |
| 2011/0258003 | A1* | 10/2011 | Brown | G06Q 20/40 |
| | | | | 705/3 |
| 2013/0197991 | A1* | 8/2013 | Basu | G06Q 20/102 |
| | | | | 705/14.39 |
| 2014/0052616 | A1* | 2/2014 | Choi | G06Q 20/405 |
| | | | | 705/39 |
| 2015/0170267 | A1* | 6/2015 | Dilip | G06Q 40/02 |
| | | | | 705/39 |
| 2015/0332268 | A1* | 11/2015 | Cowen | G06Q 20/204 |
| | | | | 705/44 |
| 2016/0342758 | A1* | 11/2016 | Ivanoff | G06Q 20/14 |
| 2017/0004487 | A1* | 1/2017 | Hagen | G06F 16/215 |
| 2017/0098216 | A1* | 4/2017 | Studnitzer | G06Q 20/4014 |
| 2017/0178134 | A1* | 6/2017 | Senci | G06Q 20/407 |
| 2017/0264753 | A1 | 9/2017 | Rae et al. | |
| 2018/0040064 | A1* | 2/2018 | Grigg | G06N 5/022 |
| 2018/0060843 | A1* | 3/2018 | Maheshwari | G06Q 20/3224 |
| 2018/0204281 | A1* | 7/2018 | Painter | G06Q 20/4037 |

FOREIGN PATENT DOCUMENTS

| | | |
|---|---|---|
| CN | 105631732 A | 6/2016 |
| CN | 107085769 A | 8/2017 |
| CN | 107818460 A | 3/2018 |
| CN | 107845031 A | 3/2018 |
| CN | 108133372 A | 6/2018 |
| CN | 108230153 A | 6/2018 |

OTHER PUBLICATIONS

Written Opinion of the International Search Authority in International Application No. PCT/CN2019/091092, dated Sep. 19, 2019.

* cited by examiner

POST-PAID TRANSACTION DATA PROCESSING METHOD AND DEVICE, PROCESSING APPARATUS, AND SERVER

CROSS-REFERENCE TO RELATED APPLICATIONS

This application is a continuation application of International Application No. PCT/CN2019/091092, filed on Jun. 13, 2019, which is based upon and claims priority to Chinese Patent Application No. 201810841320.8, filed on Jul. 27, 2018, the entire content of all of which is incorporated herein by reference.

TECHNICAL FIELD

This specification relates to the technical field of risk prevention and control, and in particular, relates to a post-paid transaction data processing method and device.

BACKGROUND

With the development of science and technology, there are more and more users who use c-wallets to conduct buy-now-pay-later transactions. After merchants activate buy-now-pay-later services, they can collect money through third-party e-wallets.

Since a user may have many fund channels in an e-wallet, and information may not be communicated between an e-wallet and a merchant, in the buy-now-pay-later mode, the merchant may not determine whether all the fund channels in the user's e-wall et can pay for the purchase of a commodity. A fraudster may use an e-wall et account having little or no money to purchase a buy-now-pay-later service or commodity from a merchant. When the merchant requests deduction from the e-wallet platform, deduction failure may occur.

SUMMARY

This specification provides a post-paid transaction data processing method and device, which may improve the reliability of risk prevention and control for post-paid transactions, reduce the risk of post-paid transactions, reduce the loss of funds of post-paid transactions, and improve the user experience of post-paid transactions.

According to a first aspect of embodiments of this specification, a post-paid transaction data processing method includes: receiving risk search information via a wireless or wired interface, the risk search information including a transaction amount and a transaction user identifier of a post-paid transaction; acquiring, according to the transaction user identifier, a payment channel corresponding to the transaction user identifier; determining a predictive affordable value of the payment channel for the transaction amount based on the payment channel and the transaction amount; and determining a default evaluation result of the post-paid transaction according to the predictive affordable value.

According to a second aspect of embodiments of this specification, a post-paid transaction data processing device includes: a processor; and a memory storing instructions executable by the processor, wherein the processor is configured to: receive risk search information via a wireless or wired interface, the risk search information including a transaction amount and a transaction user identifier of a post-paid transaction; acquire, according to the transaction user identifier, a payment channel corresponding to the transaction user identifier; determine a predictive affordable value of the payment channel for the transaction amount based on the payment channel and the transaction amount; and determine a default evaluation result of the post-paid transaction according to the predictive affordable value.

According to a third aspect of embodiments of this specification, a non-transitory computer-readable storage medium has stored thereon instructions that, when executed by a processor of a device, cause the device to perform a post-paid transaction data processing method. The method includes: receiving risk search information via a wireless or wired interface, the risk search information including a transaction amount and a transaction user identifier of a post-paid transaction; acquiring, according to the transaction user identifier, a payment channel corresponding to the transaction user identifier; determining a predictive affordable value of the payment channel for the transaction amount based on the payment channel and the transaction amount; and determining a default evaluation result of the post-paid transaction according to the predictive affordable value.

With the post-paid transaction data processing method and device, processing apparatus, and server provided in this specification, before a post-paid transaction is concluded, an analysis is performed on a payment channel of a transaction user of the post-paid transaction to determine a predictive affordable value of the payment channel for a transaction amount; and a default evaluation result of whether an account of the transaction user can afford the transaction amount of the post-paid transaction is determined according to the predictive affordable value of the payment channel. By performing a prediction analysis of payment possibility based on a payment channel, the accuracy and precision of default prediction for a post-paid transaction are improved, the reliability of risk prevention and control for a post-paid transaction is improved, the risk of a post-paid transaction is reduced, the loss of funds of a post-paid transaction is reduced, and the user experience of a post-paid transaction is improved.

BRIEF DESCRIPTION OF THE DRAWINGS

The accompanying drawings, which are incorporated in and constitute a part of the specification, illustrate embodiments consistent with the specification and, together with the description, serve to explain the principles of the specification.

DETAILED DESCRIPTION

Figure 1:
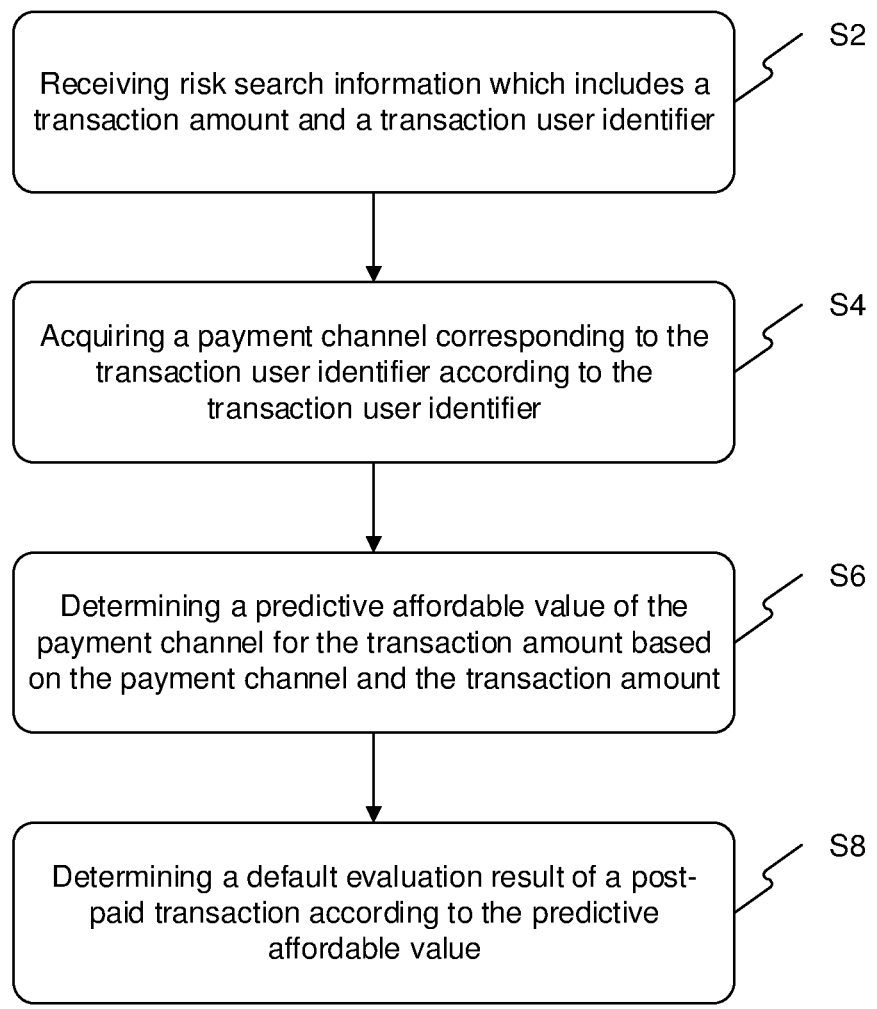
FIG. 1 is a flowchart of a post-paid transaction data processing method according to an embodiment.

Embodiments will be described in detail here, examples of which are shown in the drawings. When the following description refers to the accompanying drawings, unless otherwise indicated, the same numerals in different drawings represent the same or similar elements. The implementations described in the following example embodiments do not represent all implementations consistent with the specification. Rather, they are only examples of apparatuses and methods consistent with some aspects of the specification as recited in the appended claims.

More and more merchants may provide buy-now-pay-later services. When using buy-now-pay-later services, merchants will usually access a third-party e-wallet as one of payment methods. In order to improve users' shopping and payment experience, users, merchants, and e-wallets may sign deduction-without-password agreements, thus allowing merchants to automatically deduct users' assets in third-party e-wallets. When conducting a buy-now-pay-later transaction, also referred to as a post-paid transaction, a user can first tip out a product for a certain period of time. After the certain period of time, if the user does not return the product, a merchant can automatically deduct a corresponding amount from a third-party e-wallet through the e-wallet.

Since the merchant and the third-party e-wallet platform are independently operating entities, data information may not be interoperable. When deduction-without-password is performed, there may be a situation where funds in the e-wallet are insufficient, leading to a deduction failure and thus resulting in the merchant's NSF (Non-sufficient fund risk) loss of hinds.

With the post-paid transaction data processing method provided in the embodiments of this specification, when conducting a buy-now-pay-later transaction, transaction data can be processed before the transaction is concluded, so as to determine a default (failure to fulfill an obligation) evaluation result of the current transaction, and then a merchant can determine whether to approve the current buy-now-pay-later transaction according to the default evaluation result. Therefore, the effort of risk prevention and control for buy-now-pay-later transactions is improved, the loss of funds is reduced, and the user experience is improved.

In embodiments of the present application, the buy-now-pay-later transaction data processing method can be performed on a server, a client terminal, such as a smart phone, a tablet computer, a smart wearable device (e.g., a smart watch, virtual reality glasses, a virtual reality helmet, etc.), or other electronic devices.

FIG. 1 is a flowchart of a post-paid transaction data processing method according to an embodiment. As shown in FIG. 1, the post-paid transaction data processing method includes the following operations.

In operation S2, risk search information is received via a wireless or wired interface, the risk search information including a transaction amount and a transaction user identifier.

In an embodiment, after receiving a post-paid service request, a merchant may first invoke a risk inquiry interface of a post-paid transaction data processing system, and send risk search information to a post-paid transaction data processing device through the risk inquiry interface. The risk inquiry interface may be implemented with a wireless or wired interface. The risk search information may include relevant information about the current post-paid transaction, such as a transaction amount, a transaction user identifier, a transaction merchant identifier, a transaction time, a transaction location, etc. The transaction user identifier may include: an account name of a transaction user, for example, an account name of an e-wallet, an account name of a transaction platform, etc., and the transaction merchant identifier may include an account name of a transaction merchant. The risk search information may further include other information, such as a commodity type, and the specific content of risk search information may be adjusted according to actual needs, which is not limited in the embodiments of this specification.

The risk search information can be sent and received through wireless network transmission, Bluetooth, wired networks, etc. and can be set according to actual needs, which is not limited in the embodiments of this specification.

In operation S4, a payment channel corresponding to the transaction user identifier is acquired according to the transaction user identifier.

In an embodiment, after receiving the risk search information, a payment channel of an account of a transaction user corresponding to the transaction user identifier may be searched according to the transaction user identifier in the risk search information. The payment channel may include payment channels in an e-wallet, such as bank card accounts, credit card accounts, prepaid cards, red envelope coupons, etc., which have been bound.

In operation S6, a predictive affordable value of the payment channel for the transaction amount is determined based on the payment channel and the transaction amount.

The predictive affordable value may indicate a capacity of the payment channel to pay the transaction amount of the post-paid transaction. The predictive affordable value may be expressed as a percentage or a multiple value, and may also be expressed in other ways. After acquiring the payment channel corresponding to the transaction user identifier, the predictive affordable value of the payment channel for the transaction amount can be determined according to the flow of funds or other information in the payment channel and the transaction amount of the current post-paid transaction. For example, if the amount in the payment channel is half of the transaction amount, it can be considered that the account of the user of the post-paid transaction may only pay half of the transaction amount, and then the predictive affordable value can be determined as 50%.

In an embodiment, determining the predictive affordable value of the payment channel for the transaction amount based on the payment channel and the transaction amount includes: acquiring historical bill data of the payment channel; determining a predictive amount of funds corresponding to the payment channel at a transaction time according to the historical bill data; and determining a predictive affordable value of the payment channel for the transaction amount according to the transaction amount and the predictive amount of funds of the payment channel.

In an embodiment, historical bill data may indicate the flow of funds in the payment channel within a specified time, and may include the inflow and outflow of funds in the payment channel, such as the flow of funds of bank card A within one month before the transaction time. The historical bill data of the payment channel can be acquired by acquiring bill records of the payment channel within a preset time period before the transaction time. After finding the payment channel of the transaction user identifier through searching, the historical bill data of the payment channel can be acquired, the history of fund flow of the payment channel can be acquired, and the predictive amount of funds in the payment channel at the current transaction time can be predicted according to the history of fund flow of the payment channel. For example, based on the history of fund flow in the payment channel, timing analysis and prediction algorithms, such as regression methods, averaging methods, model prediction, etc., can be used to calculate a coverable position of the payment channel for the transaction amount at the current transaction time, to obtain the predictive amount of funds in the payment channel. Also for example, timing analysis can be used to calculate a relationship between current values and past values of a variable, and to predict the predictive amount of funds in the payment channel at the transaction time according to the past fund flow in the payment channel. The predictive affordable value of the payment channel for the transaction amount can be determined according to a comparison between the determined predictive amount of funds in the payment channel and the transaction amount of the post-paid transaction.

In an embodiment, there are multiple payment channels in the account of the transaction user who conducts the post-paid transaction. Accordingly, historical bill data of each payment channel can be acquired respectively, and according to the historical bill data of each payment channel, a predictive amount of funds corresponding to each payment channel at the transaction time can be determined, and then the predictive affordable value of each payment channel can further be determined. The predictive affordable values of all the payment channels can be added to determine a total predictive affordable value of all payment channels of the transaction user. In another embodiment, the total predictive affordable value of the payment channels can also be determined according to the total sum of the predictive amounts of funds corresponding to all the payment channels.

In an embodiment, a fund amount prediction model can be constructed, e.g., trained by machine learning, according to the historical bill data of the payment channel in advance, for example, the relationship between the amount of funds in the payment channel and time is analyzed and summarized. The fund amount prediction models for different payment channels may be the same or different. For example, the prediction model can be constructed, e.g., trained by machine learning, according to a transaction habit and characteristics of the flow of funds of each payment channel. The constructed fund amount prediction model is used to predict the amount of funds in each payment channel.

For example, if there are two payment channels in the account of the transaction user of the post-paid transaction, bank card A and credit card B, historical bill data of bank card A and historical bill data of credit card B can be acquired respectively, and the histories of fund flow of bank card A and credit card B can be acquired respectively based on the acquired historical bill data. Timing analysis and prediction algorithms can be used to generate curves of funds in bank card A and credit card B over time. The relationships between fund flow in bank card A and credit card B and time can be analyzed according to the curves of funds over time, so as to predict the predictive amounts of funds in bank card A and credit card B at the current transaction time. The predictive affordable values of bank card A and credit card B are determined respectively according to the transaction amount of the post-paid transaction and the predictive amounts of funds of bank card A and credit card B. The predictive affordable values of bank card A and credit card B are added to determine the total predictive affordable value of the account of the transaction user of the current post-paid transaction.

By analyzing the historical bill data of each payment channel, the predictive affordable value of each payment channel for the current post-paid transaction is accurately determined, which provides an accurate data basis for subsequent prediction of a default evaluation result of the current post-paid transaction.

In an embodiment, determining the predictive affordable value of the payment channel for the transaction amount based on the payment channel and the transaction amount further includes: acquiring a transaction behavior of a transaction user corresponding to the payment channel according to the historical bill data; and determining a predictive affordable value of the payment channel for the transaction amount according to the transaction behavior, the transaction amount, and the predictive amount of funds of the payment channel.

In an embodiment, a transaction behavior of using each payment channel to conduct transactions by, the transaction user of the post-paid transaction can be acquired according to the historical bill data of the payment channel. The transaction user may indicate a user who purchases a commodity in the post-paid transaction, that is, the user corresponding to the transaction user identifier. The transaction behavior may include: the sustainability of consumption, whether there has been a default transaction, such s overdue payment, and so on. The predictive at value of the payment channel for the transaction amount can be determined by using the acquired transaction behavior, the predictive amount of funds of the payment channel, and the transaction amount. For example, a functional relationship between the transaction behavior and the predictive amount of funds of the user and a final affordable amount can be analyzed based on historical data, and a prediction model for predictive affordable values can be constructed through model training or other methods. The affordable amount of the payment channel can be determined using the prediction model, and the predictive affordable value of the payment channel for the transaction amount can be further determined.

For example, if it is learned, e.g., by machine learning, from the historical bill data of the payment channel that the payment channel of the transaction user has no fixed inflow of funds, the amount of funds in the payment channel fluctuates greatly, and the discontinuity of the user's consumption time is obvious, then it can be considered that the consumption sustainability of the user is poor. If the predictive amount of funds corresponding to the payment channel is A, it can be determined, by comprehensively considering the user's transaction behavior, that the actually affordable amount of funds of the payment channel of the transaction user is lower than A. Prediction algorithms can be used in machine learning to comprehensively analyze the predictive amount of funds and the user's transaction behavior, so as to determine the predictive coverable value of the payment channel for the transaction amount.

In addition, a credit rating or credit score of the transaction user can also be determined according to the transaction behavior of the transaction user, which provides a reference basis for determining the predictive coverable value of the payment channel for the transaction amount.

In the embodiment, by acquiring the historical bill data of the payment channel of the transaction user and analyzing the transaction behavior of the transaction user, the predictive affordable value of the payment channel for the transaction amount is predicted based on the transaction behavior and the predictive amount of funds in the payment channel.

In conjunction with the user's transaction behavior, the probability that the user may default can be analyzed accurately, which provides an accurate data basis for risk prevention and control for the post-paid transaction.

In operation S8, a default evaluation result of a post-paid transaction is determined according to the predictive affordable value.

The default evaluation result may indicate the possibility that the transaction user of the post-paid transaction has insufficient funds or has no payment amount in the account when making a payment. The default evaluation result may be in the form of default probability or default level. For example, the default level can be divided into 10 levels, and the higher the level, the greater the risk of default in the transaction. Also for example, the default evaluation result can be expressed in the form of a probability value, and the greater the probability, the greater the risk of default in the transaction. After determining the predictive affordable value of the payment channel for the payment amount, a prediction algorithm or other methods can be used to determine the default evaluation result of the current post-paid transaction. For example, a functional relationship between predictive affordable values and default probabilities can be analyzed by means of numerical simulation, model analysis, etc. For example, a default probability prediction model can be constructed, e.g., through model training, based on historical transaction data of post-paid transactions. The default probability prediction model may include a functional relationship between predictive affordable values and default probabilities. A predictive affordable value of a current post-paid transaction can be input into the default probability prediction model to determine a corresponding default probability.

In an embodiment, the default evaluation result of the post-paid transaction can be determined by using at least one method of decision tree and logistic regression. The decision tree can represent a prediction model, and can represent a mapping relationship between object attributes and object values. Logistic regression is a generalized linear regression analysis model, which is commonly used in fields such as data mining, automatic disease diagnosis, and economic prediction, and can be used to predict the probability of occurrence am event. Using the decision tree or logistic regression method can achieve an accurate prediction of the default evaluation result of the post-paid transaction, which provides an accurate data basis for risk prevention and control for the post-paid transaction.

In an embodiment, after predicting the default evaluation result corresponding to the post-paid transaction, the obtained default evaluation result may be sent, via a wireless or wired interface, to a post-paid transaction data processing terminal corresponding to the transaction merchant in the post-paid transaction, wherein the post-paid transaction data processing terminal may be a smart phone, a tablet computer, or other electronic devices. After receiving the default evaluation result, the post-paid transaction data processing terminal can determine whether the risk of the current default evaluation result is acceptable, and if acceptable, it can send, via a wireless or wired interface, request information approving this post-paid transaction to the post-paid transaction data processing device. The post-paid transaction data processing device can perform payment processing on this post-paid transaction. For example, it can deduct the transaction amount from the account of the transaction user at a payment time scheduled in the post-paid transaction and transfer the transaction amount to the account of the transaction merchant.

With the post-paid transaction data processing method provided in the embodiment of this specification, before the post-paid transaction is concluded, the payment channel of the transaction user of the post-paid transaction is analyzed to determine a predictive affordable value of the payment channel for the transaction amount; and a default evaluation result of whether the account of the transaction user can pay the transaction amount of the post-paid transaction is determined according to the predictive affordable value of the payment channel. By performing a prediction analysis of payment possibility based on a payment channel, the accuracy and precision of default prediction for a post-paid transaction is improved, the reliability of risk prevention and control for a post-paid transaction is improved, the risk of a post-paid transaction is reduced, the loss of funds of a post-paid transaction is reduced, and the user experience of a post-paid transaction is improved.

Figure 2:
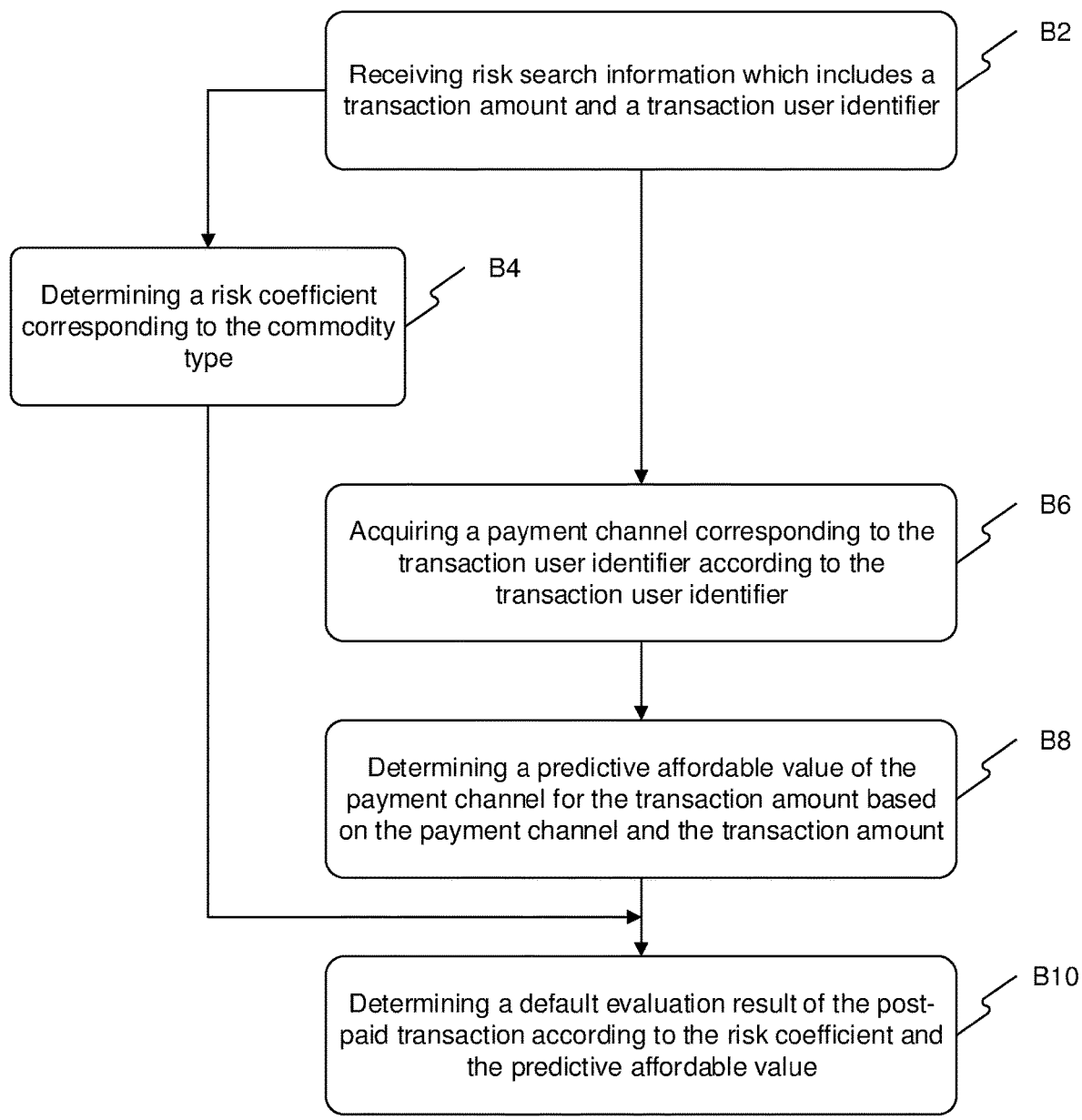
FIG. 2 is a flowchart of a post-paid transaction data processing method according to an embodiment.

FIG. 2 is a flowchart of a post-paid transaction data processing method according to an embodiment. As shown in FIG. 2, the post-paid transaction data processing method may include the following operations.

In operation B2, risk search information is received, the risk search information including a commodity type, a transaction amount, and a transaction user identifier.

In operation B4, a risk coefficient corresponding to the commodity type is determined.

In an embodiment, the commodity type may indicate the type or category of a commodity, such as a certain brand of mobile phones, a certain brand of clothing, etc., and may also include the type of a service, such as housekeeping service, travel service, etc. Different commodity types may correspond to different risk coefficients, and the risks of default of different commodity types may be different. Risk situations of different commodity types can be analyzed according to historical transaction data of post-paid transactions, and different risk coefficients can be set for different commodity types.

In an embodiment, determining the risk coefficient corresponding to the commodity type may include: acquiring historical transaction data, and acquiring a default transaction ratio corresponding to the commodity type according to the historical transaction data; and determining a risk coefficient corresponding to the commodity type according to the default transaction ratio.

In an embodiment, the historical transaction data may include transaction data of post-paid transactions within a preset time period, e.g., within one month before a current transaction time. For example, the transaction data may include: commodity types, transaction amounts, default situations, etc. of the post-paid transactions within the preset time period. A default transaction ratio of a commodity type of a current post-paid transaction in the historical transaction data can be analyzed, and a risk coefficient of the commodity type of the current post-paid transaction can be determined according to the default transaction ratio. For example, if the default ratio of the commodity type of the current post-paid transaction is 50%, the risk coefficient corresponding to this commodity type can be determined as 0.5. The risk coefficient of the commodity type can also be determined according to other methods. The risk coefficient can also be adjusted and updated based on real-time historical transaction data.

The analysis on risk coefficients corresponding to different commodity types provides an accurate data basis for subsequent determination of a default evaluation result of a current post-paid transaction.

In operation B6, a payment channel corresponding to the transaction user identifier is acquired according to the transaction user identifier.

For example, all payment channels of the account of the transaction user of the post-paid transaction in the e-wallet can be scanned.

In operation B8, a predictive affordable value of the payment channel for the transaction amount is determined based on the payment channel and the transaction amount.

According to historical bill data of each payment channel, the timing analysis method and prediction algorithm can be used to respectively calculate a predictive affordable value of each payment channel for the transaction amount at a current transaction time, and to further calculate a predictive affordable values corresponding to all payment channels. Reference may be made to the description of the embodiments in FIG. 1, which will not be repeated here.

In operation B10, a default evaluation result of the post-paid transaction is determined according to the risk coefficient and the predictive affordable value.

After determining the risk coefficient corresponding to the commodity type of the current post-paid transaction and the predictive affordable value corresponding to the payment channel, a default evaluation result of the post-paid transaction can be predicted, by comprehensively considering the risk coefficient of the commodity type and the predictive affordable value of the payment channel, with a method such as decision tree or logistic regression. Reference may be made to the description of the embodiments in FIG. 1 for the expression form of the default evaluation result, which will not be repeated here. For example, the default evaluation result of the current post-paid transaction can be predicted through prediction models or algorithms based on historical transaction data, risk coefficients of constructed commodity types, predictive affordable values of payment channels, and prediction models or algorithms for default evaluation results of post-paid transactions.

In the embodiments of this specification, before conducting a post-paid transaction, the risk coefficient of the commodity type of the post-paid transaction and the situation of funds in the transaction channel corresponding to the transaction user are comprehensively considered, so that the default evaluation result of the post-paid transaction can be accurately determined, and therefore, the risk prevention and control for the post-paid transaction can be improved, the loss of funds can be reduced, and the user experience of the post-paid transaction can be improved.

The above embodiments are described in a progressive manner, and for the same or similar parts between the embodiments, reference can be made to each other.

Based on the above described post-paid transaction data processing method, embodiments of this specification further provide a post-paid transaction data processing device. The device may include a system (including a distributed system), software (an application), modules, components, servers, client terminals, etc. For the implementation of the device in the embodiments of this specification, reference can be made to the implementation of the foregoing method. Each of the modules described below may be implemented by software, or hardware, or a combination of software and hardware.

Figure 3:
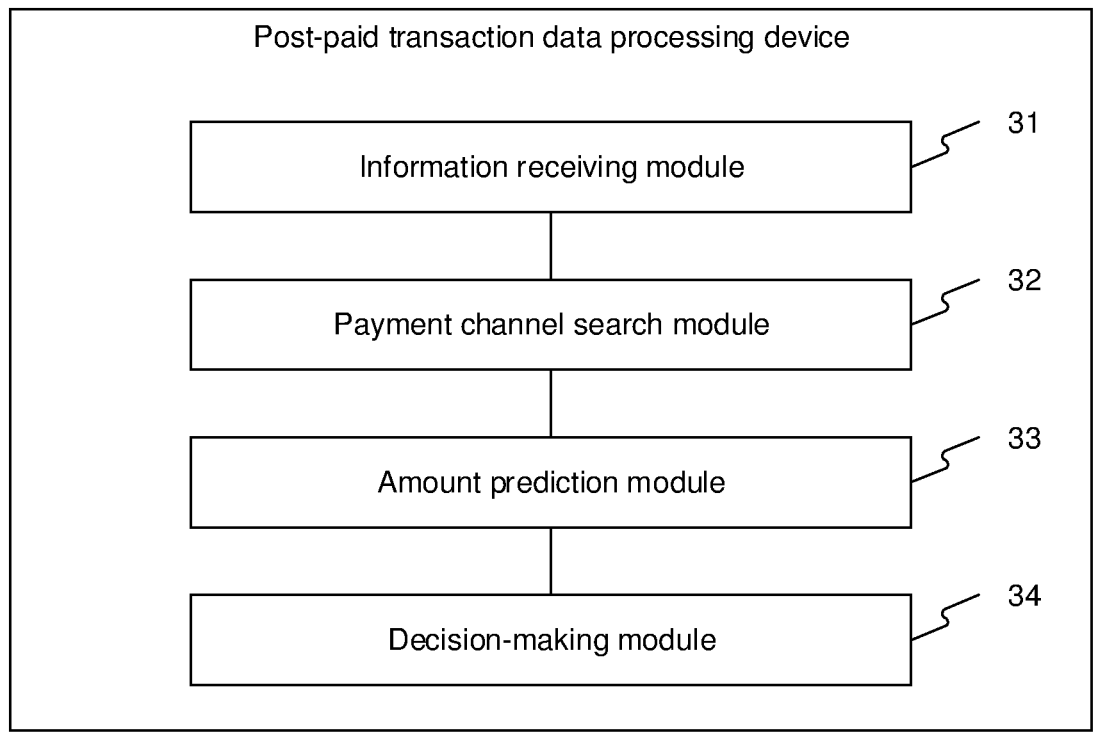
FIG. 3 is a schematic diagram of a post-paid transaction data processing device according to an embodiment.

FIG. 3 is a schematic diagram of a post-paid transaction data processing device according to an embodiment. As show in FIG. 3, the post-paid transaction data processing device includes an information receiving module 31, a payment channel search module 32, an amount prediction module 33, and a decision-making module 34.

The information receiving module 31 is configured to receive risk search information, the risk search information including a transaction amount and a transaction user identifier. The payment channel search module 32 is configured to acquire a payment channel corresponding to the transaction user identifier according to the transaction user identifier. The amount prediction module 33 is configured to determine a predictive affordable value of the payment channel for the transaction amount based on the payment channel and the transaction amount. The decision-making module 34 is configured to determine a default evaluation result of a post-paid transaction according to the predictive affordable value.

With the post-paid transaction data processing device provided in the embodiment, before a post-paid transaction is confirmed, a payment channel of a transaction user of the post-paid transaction is analyzed to determine a predictive affordable value of the payment channel for the transaction amount; and a default evaluation result of whether the account of the transaction user can pay the transaction amount of the post-paid transaction is determined according to the predictive affordable value of the payment channel. By performing a prediction analysis of payment possibility based on a payment channel, the accuracy and precision of default prediction for a post-paid transaction are improved, the reliability of risk prevention and control for a post-paid transaction is improved, the risk of a post-paid transaction is reduced, the loss of funds of a post-paid transaction is reduced, and the user experience of a post-paid transaction is improved.

Figure 4:
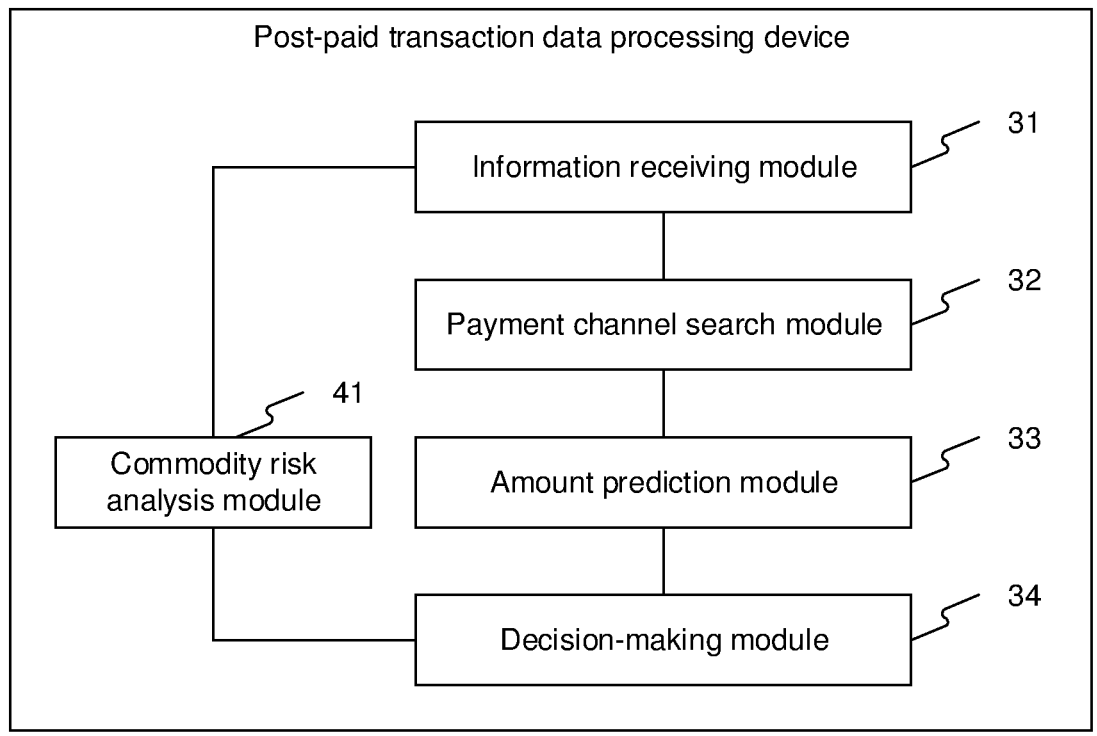
FIG. 4 is a schematic diagram of a post-paid transaction data processing device according to an embodiment.

FIG. 4 is a schematic diagram of a post-paid transaction data processing device according to an embodiment. In the embodiment, the risk search information further includes a commodity type. Accordingly, the device further includes: a commodity risk analysis module 41 configured to determine a risk coefficient corresponding to the commodity type, and the decision-making module 34 is further configured to determine a default evaluation result of the post-paid transaction according to the risk coefficient and the predictive affordable value.

With the post-paid transaction data processing device provided in the embodiment, before conducting a post-paid transaction, a risk coefficient of a commodity type of the post-paid transaction and the situation of funds in a transaction channel corresponding to the transaction user are comprehensively considered, so that a default evaluation result of the post-paid transaction can be accurately determined, and therefore, the risk prevention and control for the post-paid transaction can be improved, the loss of funds can be reduced, and the user experience of the post-paid transaction can be improved.

In an embodiment, the amount prediction module 33 is further configured to: acquire historical bill data of the payment channel; determine a predictive amount of funds corresponding to the payment channel at a transaction time according to the historical bill data; and determine a predictive affordable value of the payment channel for the transaction amount according to the predictive amount of funds of the payment channel and the transaction amount.

With the post-paid transaction data processing device provided in the embodiment, by analyzing the historical bill data of each payment channel, the predictive affordable value of each payment channel for the current post-paid transaction is determined, which provides an accurate data basis for subsequent prediction of a default evaluation result of the current post-paid transaction.

In an embodiment, the amount prediction module 33 is further configured to: acquire a transaction behavior of a transaction user corresponding to the payment channel according to the historical bill data; and determine a predictive affordable value of the payment channel for the transaction amount according to the transaction behavior, the transaction amount, and the predictive amount of funds of the payment channel.

In the embodiment, by acquiring the historical bill data of the payment channel of the transaction user and analyzing the transaction behavior of the transaction user, the predictive affordable value of the payment channel for the transaction amount is predicted based on the transaction behavior and the predictive amount of funds in the payment channel. In conjunction with the user's transaction behavior, the probability that the user may default can be analyzed accurately, which provides an accurate data basis for risk prevention and control for the post-paid transaction.

In an embodiment, the commodity risk analysis module 41 is configured to: acquire historical transaction data, and acquire a default transaction ratio corresponding to the commodity type according to the historical transaction data; and determine a risk coefficient corresponding to the commodity type according to the default transaction ratio.

In the embodiment, the analysis on risk coefficients corresponding to different commodity types provides an accurate data basis for subsequent determination of a default evaluation result of a current post-paid transaction.

In an embodiment, the decision-making module 34 is configured to: determine a default evaluation result of a post-paid transaction according to the predictive affordable value by using at least one method of decision tree and logistic regression.

In the embodiment, using the decision tree or logistic regression method can achieve an accurate prediction of the default evaluation result of the post-paid transaction, which provides an accurate data basis for risk prevention and control for the post-paid transaction.

Figure 5:
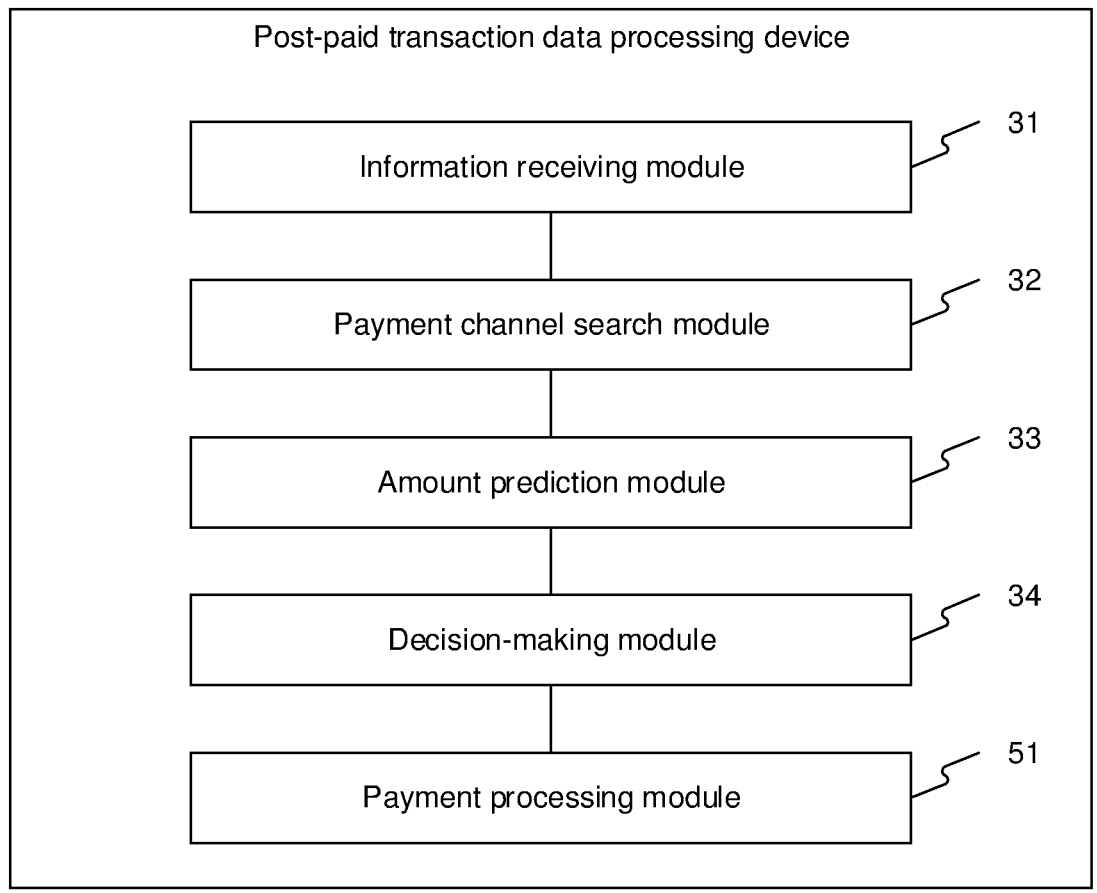
FIG. 5 is a schematic diagram of a post-paid transaction data processing device according to an embodiment.

FIG. 5 is a schematic diagram of a post-paid transaction data processing device according to an embodiment. As shown in FIG. 5, on the basis of the above embodiment, the device further includes a payment processing module 51 configured to send the default evaluation result to a post-paid transaction data processing terminal which corresponds to a transaction merchant of the post-paid transaction; and receive request information approving the post-paid transaction, and perform payment processing on the post-paid transaction.

In the embodiment, the default evaluation result determined based on the commodity type of the post-paid transaction, the transaction amount, relevant information about the payment channel of the transaction user, etc. is sent to the client terminal of the transaction merchant, so that the transaction merchant can determine whether to approve this transaction according to the default evaluation result of the current post-paid transaction, thereby improving the accuracy of risk prevention and control for the post-paid transaction and reducing the loss of funds of the transaction merchant.

Embodiments of this specification further provide a post-paid transaction data processing device, including: at least one processor and a memory for storing processor-executable instructions which, when executed by the processor, implement the post-paid transaction data processing method described above. For example: the processor is configured to perform: receiving risk search information which includes a transaction amount and a transaction user identifier; acquiring a payment channel corresponding to the transaction user identifier according to the transaction user identifier; determining a predictive affordable value of the payment channel for the transaction amount based on the payment channel and the transaction amount; and determining a default evaluation result of a post-paid transaction according to the predictive affordable value.

Embodiments of this specification further provide a non-transitory computer-readable storage medium having stored thereon a computer program which, when executed, implements the post-paid transaction data processing method described above. The storage medium may include a physical device for storing information, which usually digitizes the information and then stores the same in a medium in an electrical, magnetic, or optical manner. The storage medium may include: a device that stores information by means of electrical energy, such as various types of memories, for example, a RAM and a ROM; a device that stores information by means of magnetic energy, such as a hard disk, a floppy disk, a magnetic tape, a magnetic core memory, a bubble memory, and a USB disk; and a device that stores information by optical means, such as a CD or a DVD. There are other forms of readable storage media, such as quantum memory, graphene memory, and so on.

It should be noted that the above-described post-paid transaction data processing device may also include other implementations. For example, the default evaluation result of the transaction can also be comprehensively predicted by combining the risk coefficient corresponding to the commodity type of the post-paid transaction and the predictive affordable value of the payment channel. For specific implementations, reference may be made to the description of relevant method embodiments, and details are not repeated herein.

Embodiments of this specification further provide a post-paid transaction data processing system. The system can be a separate post-paid transaction data processing system, or can be applied in a variety of data analysis and processing systems. The system may be a separate server, or may include a server cluster, a system (including a distributed system), software (an application), an actual operating device, a logic gate circuit device, a quantum computer, etc. using the methods described above. The system may include at least one processor and a memory storing computer-executable instructions which, when executed by the processor, implement the operations of the methods described above.

Figure 6:
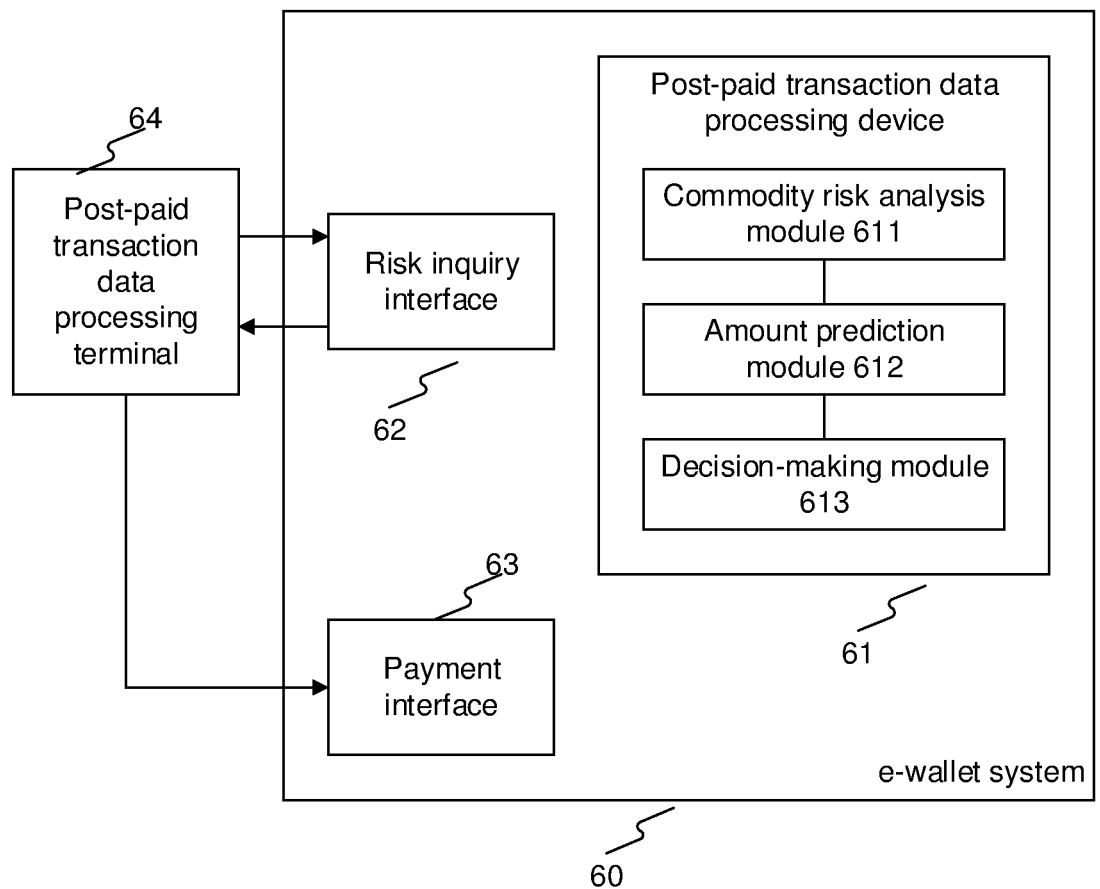
FIG. 6 is a schematic diagram of a post-paid transaction data processing system according to an embodiment.

FIG. 6 is a schematic diagram of a post-paid transaction data processing system according to an embodiment. As shown in FIG. 6, the post-paid transaction data processing system may be an e-wallet system 60, which may include a post-paid transaction data processing device 61, a risk inquiry interface 62, and a payment interface 63. The post-paid transaction data processing system may further include a post-paid transaction data processing terminal 64 corresponding to a transaction merchant. The post-paid transaction data processing device 61 may include a commodity risk analysis module 611, an amount prediction module 612, and a decision-making module 613. The risk inquiry interface 62 and the payment interface 63 are configured for data communication with the post-paid transaction data processing terminal 64 corresponding to the transaction merchant. The post-paid transaction data processing system includes at least one processor and a memory for storing processor-executable instructions which, when executed by the processor, implement the post-paid transaction data processing method described above including, for example: receiving risk search information which includes a transaction amount and a transaction user identifier; acquiring a payment channel corresponding to the transaction user identifier according to the transaction user identifier determining a predictive affordable value of the payment channel for the transaction amount based on the payment channel and the transaction amount; and determining a default evaluation result of a post-paid transaction according to the predictive affordable value.

Figure 7:
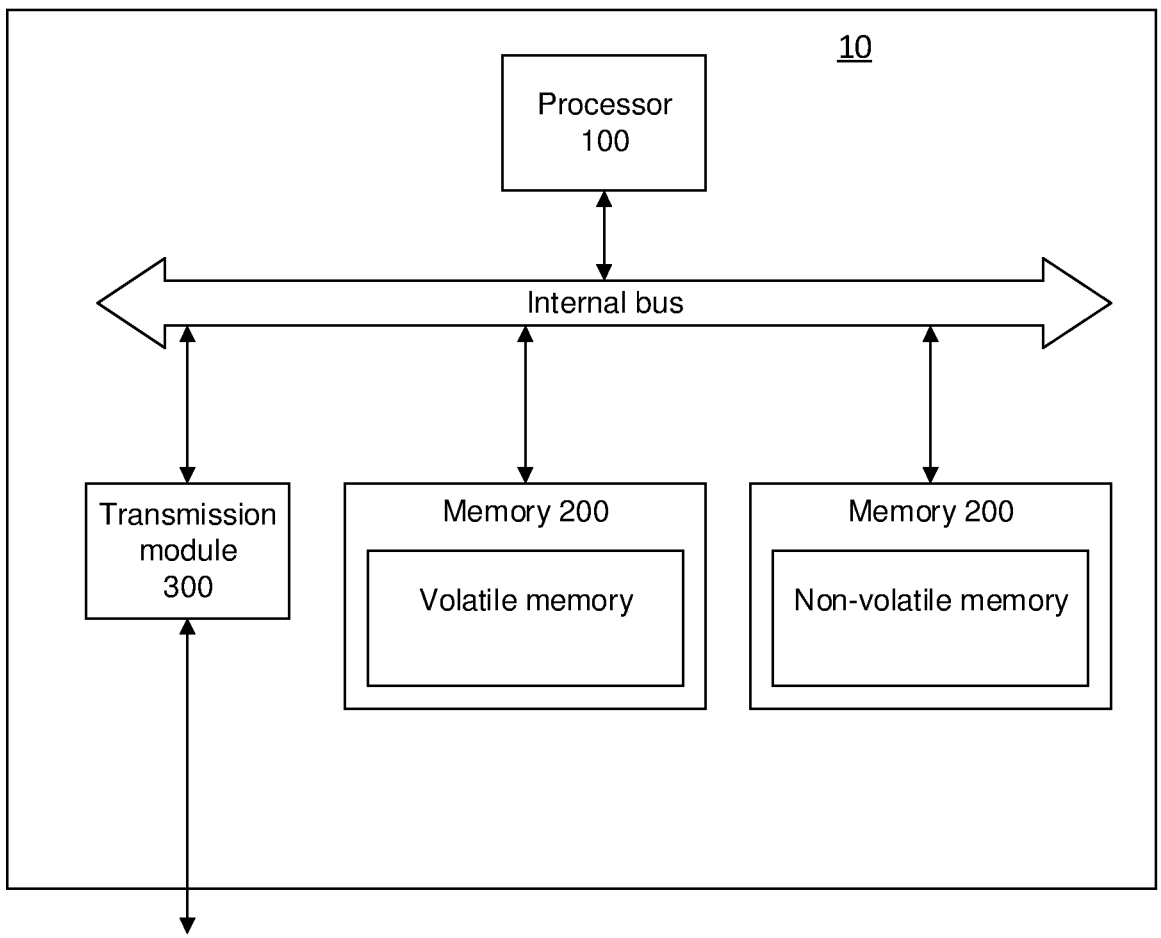
FIG. 7 is a block diagram of a data processing apparatus according to an embodiment.

FIG. 7 is a block diagram of a post-paid transaction data processing apparatus 10 according to an embodiment. For example, the apparatus 10 may be a server implementing the e-wallet system 60 (FIG. 6), or a terminal implementing the post-paid transaction data processing terminal 64 (FIG. 6). As shown in FIG. 7, the apparatus 10 may include one or more (only one is shown in the figure) processors 100, which may further include, but is not limited to, a processing device such as a microprocessor (MCU) or a programmable logic device (FPGA), a memory 200 for storing data, and a transmission module 300 including a transmitter and a receiver for communication functions. Those of ordinary skill in the art may understand that the structure shown in FIG. 7 is merely illustrative, which does not limit the structure of the electronic device. For example, the apparatus 10 may also include more or fewer components than those shown in FIG. 7. For example, it may also include other processing hardware, such as a database or a multi-level cache, a GPU, or may have a configuration different from that shown in FIG. 7.

The memory 200 may store software programs and modules of application software, such as program instructions/modules corresponding to the post-paid transaction data processing method described above, and the processor 100 performs various functional applications and data processing by running the software programs and modules stored in the memory 200. The memory 200 may include a high-speed random access memory, and may also include a non-volatile memory, such as one or more magnetic storage devices, a flash memory, or another non-volatile solid-state memory. In some embodiments, the memory 200 may further include memories remotely arranged with respect to the processor 100, and these remote memories may be connected to the apparatus 10 through a network. Examples of the network include, but are not limited to, the Internet, an intranet, a local area network, a mobile communication network, and a combination thereof.

The transmission module 300 may receive or send data via a network. Examples of the network may include a wireless network provided by a communication provider. In an embodiment, the transmission module 300 includes a Network Interface Controller (NIC), which can be connected to other network devices through a base station so as to communicate with the Internet. In an embodiment, the transmission module 300 may be a Radio Frequency (RF) module, which is used to communicate with the Internet in a wireless manner.

Figure 8:
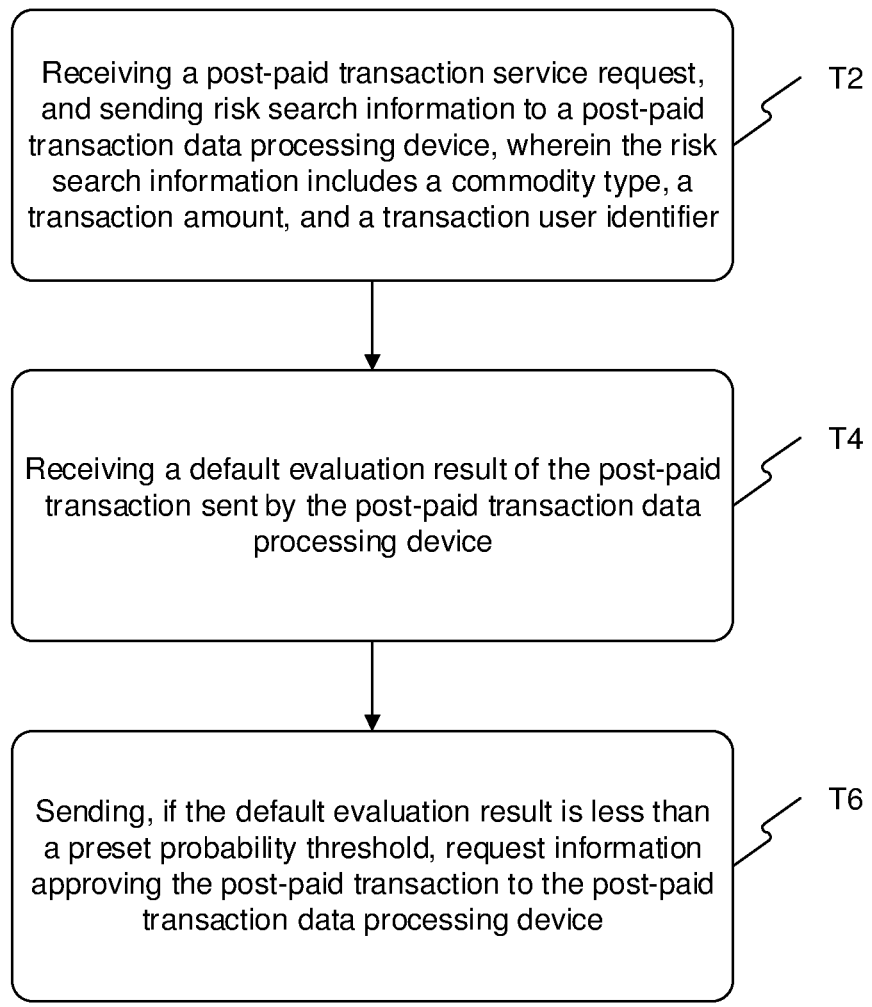
FIG. 8 is a flowchart of a post-paid transaction data processing method according to an embodiment.

FIG. 8 is a flowchart of a post-paid transaction data processing method in another embodiment. As shown in FIG. 8, the transaction data processing method may be performed at a transaction merchant side of a post-paid transaction, and may include the following operations.

In operation T2, a post-paid transaction service request is received, and risk search information is sent to a post-paid transaction data processing device, wherein the risk search information includes a commodity type, a transaction amount, and a transaction user identifier.

After receiving the post-paid transaction service request, the transaction merchant can send a risk search request to a post-paid transaction data processing device, such as an e-wallet system or a post-paid transaction data processing system, through a post-paid transaction data processing terminal corresponding to the transaction merchant, such as a smart phone, a tablet computer, or a smart portable device. For example, after receiving the post-paid transaction service request, the post-paid transaction data processing terminal can send risk search information to the post-paid transaction data processing system through the risk inquiry interface 62 in FIG. 6, and the post-paid transaction data processing system sends the received risk search information to the post-paid transaction data processing device. The risk search information may include: a commodity type, a transaction amount, and a transaction user identifier. For the specific content of the risk search information, reference can be made to the above embodiments, and details will not be repeated here.

In operation T4, a default evaluation result of a post-paid transaction sent by the post-paid transaction data processing device is received.

After the transaction merchant sends the risk search information to the post-paid transaction data processing device, the post-paid transaction data processing device generates the default evaluation result of the current post-paid transaction based on the received risk search information, and sends the determined default evaluation result to the post-paid transaction data processing terminal of the transaction merchant.

In operation T6, if the default evaluation result is less than a preset probability threshold, request information approving the post-paid transaction is sent to the post-paid transaction data processing device.

The transaction merchant can determine whether to accept the current post-paid transaction according to the default evaluation result received by the post-paid transaction data processing terminal, for example, determining whether to accept the post-paid transaction based on the default evaluation result and a preset probability threshold. If the default evaluation result is less than the preset probability threshold, and the transaction merchant can accept such a risk, request information approving the current post-paid transaction can be sent to the post-paid transaction processing device through the post-paid transaction data processing terminal. The post-paid transaction data processing device can perform payment processing after receiving the request information approving the post-paid transaction sent by the transaction merchant through the post-paid transaction processing terminal. For example, it can deduct the transaction amount from the account of the transaction user at the payment time scheduled in the post-paid transaction and transfer the transaction amount to the account of the transaction merchant.

If the received default evaluation result is relatively high, and the transaction merchant believes that the default risk of the current post-paid transaction cannot be accepted, it can reject this post-paid transaction, and can send request information rejecting the post-paid transaction to the e-wallet system through the post-paid transaction terminal.

In the embodiment, by analyzing the transaction commodity type of the post-paid transaction and the payment channel of the transaction user before the post-paid transaction is concluded, the default evaluation result of the post-paid transaction is determined, and the transaction merchant determines whether to accept this post-paid transaction based on the determined default evaluation result. The accuracy of risk prevention and control for the post-paid transaction is improved, the loss of funds of the transaction merchant is reduced, and the user experience of the post-paid transaction is improved.

Figure 9:
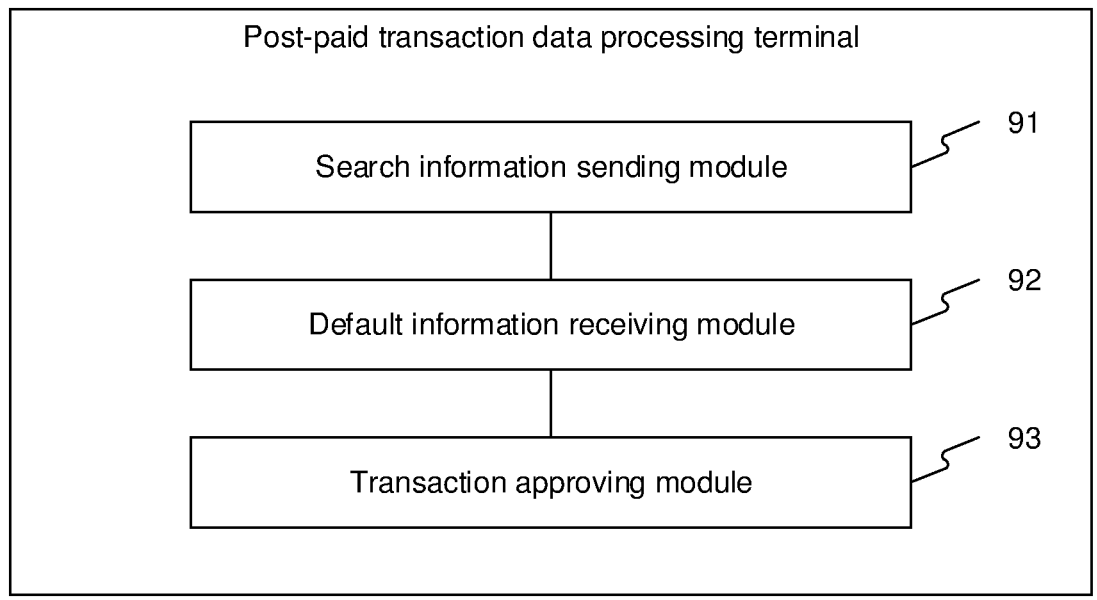
FIG. 9 is a schematic diagram of a post-paid transaction data processing terminal according to an embodiment.

FIG. 9 is a schematic diagram of a post-paid transaction data processing terminal according to an embodiment. As shown in FIG. 9, the post-paid transaction data processing terminal may include: a search information sending module 91 configured to receive a post-paid transaction service request, and send risk search information to a post-paid transaction data processing device, wherein the risk search information includes a commodity type, a transaction amount, and a transaction user identifier; a default information receiving module 92 configured to receive a default evaluation result of a post-paid transaction sent by the post-paid transaction data processing device; and a transaction approving module 93 configured to send, if the default evaluation result is less than a preset probability threshold, request information approving the post-paid transaction to the post-paid transaction data processing device.

In the embodiment, by analyzing the transaction commodity type of the post-paid transaction and the payment channel of the transaction user before the post-paid transaction is concluded, the default evaluation result of the post-paid transaction is determined, and the transaction merchant determines whether to accept this post-paid transaction based on the determined default evaluation result. The accuracy of risk prevention and control for the post-paid transaction is improved, the loss of funds of the transaction merchant is reduced, and the user experience of the post-paid transaction is improved.

Embodiments of this specification further provide a post-paid transaction data processing terminal, such as a smart phone terminal, a tablet computer, or a smart portable device, the terminal including: at least one processor and a memory for storing instructions executable by the processor to implement the post-paid transaction data processing method described above. For example, the processor is configured to perform: receiving a post-paid transaction service request, and sending risk search information to a post-paid transaction data processing device, wherein the risk search information includes a commodity type, a transaction amount, and a transaction user identifier; receiving a default evaluation result of a post-paid transaction sent by the post-paid transaction data processing device; and sending, if the default evaluation result is less than a preset probability threshold, request information approving the post-paid transaction to the post-paid transaction data processing device.

Embodiments of this specification further provide a non-transitory computer-readable storage medium having stored thereon a computer program which, when executed, implements the video data processing method described above including, for example, receiving a post-paid transaction service request, and sending risk search information to a post-paid transaction data processing device, wherein the risk search information includes a commodity type, a transaction amount, and a transaction user identifier; receiving a default evaluation result of a post-paid transaction sent by the post-paid transaction data processing device; and sending, if the default evaluation result is less than a preset probability threshold, request information approving the post-paid transaction to the post-paid transaction data processing device.

The storage medium may include a physical device for storing information, which usually digitizes the information and then stores the same in the medium in an electrical, magnetic, or optical manner. The storage medium may include: a device that stores information by means of electrical enemy, such as various types of memories, for example, a RAM and a ROM; a device that stores information by means of magnetic energy, such as a hard disk, a floppy disk, a magnetic tape, a magnetic core memory, a bubble memory, and a USB disk; and a device that stores information by optical means, such as a CD or a DVD. There are other forms of readable storage media, such as quantum memory, graphene memory, and so on.

The foregoing describes example embodiments of this specification. Other embodiments may be within the scope of the appended claims. In some cases, the operations or steps recited in the claims can be performed in an order different from the order in the embodiments and can still achieve desired results. In addition, the processes depicted in the drawings do not necessarily require the particular order shown or a sequential order to achieve the desired results. In certain implementations, multitasking and parallel processing are also possible or may be advantageous.

The above described post-paid transaction data processing methods or devices can be implemented by a processor executing corresponding program instructions in a computer, such as being implemented at a PC end by using the C++ language of the windows operating system, being implemented in a linux system, or in other manners, for example, being implemented at a smart terminal by using the programming languages of the android and iOS systems, being implemented based on the processing logic of a quantum computer, etc.

The embodiments in this specification are described in a progressive manner, and for the same or similar parts between the embodiments, reference can be made to each other.

The embodiments of this specification are not limited to the situations that must comply with industry communication standards, standard computer data processing and data storage rules, or the situations described in one or more embodiments of this specification. Some industry standards, or implementation solutions obtained through slight modifications in a customized manner or based on implementations described in the embodiments can also achieve the same, equivalent, or similar implementation effects of the above embodiments, or predictable implementation effects after variations.

In the 1990s, it can be obviously distinguished whether an improvement to a technology is an improvement in hardware (e.g., an improvement to a circuit structure, such as a diode, a transistor, or a switch) or an improvement in software (an improvement to a process). However, with the development of technologies, nowadays, the improvement to many method flows can be regarded as a direct improvement to a hardware circuit structure. Almost all designers program improved method flows into hardware circuits to obtain corresponding hardware circuit structures. Therefore, an improvement to a method flow can be implemented by hardware physical modules. For example, a Programmable Logic Device (PLD) (e.g., a Field Programmable Gate Array (FPGA)) is such an integrated circuit, of which the logic function is determined by a user through programming the device. Designers integrate a digital system onto a piece of PLD by independent programming without asking a chip manufacturer to design and manufacture a dedicated integrated circuit chip. Moreover, at present, instead of manually making an integrated circuit chip, this programming is also implemented mostly using logic compiler software, which is similar to a software compiler used for program development and compilation. However, the original code before compilation also has to be compiled using a specific programming language, which is known as a Hardware Description Language (HDL), There is not only one, but many kinds of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are the most commonly used. Those skilled in the art should also understand that a hardware circuit for implementing a logic method flow can be obtained by logically programming the method flow using the above several hardware description languages and programming it into an integrated circuit.

In some embodiments, the above described post-paid transaction data processing methods may be implemented with a controller. For example, the controller may be in the form of a microprocessor or processor and a computer-readable medium storing computer-readable program code (such as software or firmware) executable by this (micro) processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A controller of a memory may also be implemented as part of the control logic of the memory. Those skilled in the art also know that, in addition to implementing a controller in the form of pure computer-readable program code, the method steps can absolutely be logically programmed to enable the controller to realize the same function in the form of logic gates, switches, special integrated circuits, programmable logic controllers, embedded microcontrollers, or the like. Therefore, such a controller can be regarded as a hardware component, and the devices included therein for realizing various functions can also be regarded as the structure within the hardware component. In some embodiments, the devices for realizing various functions can even be regarded as both a software module for implementing a method and a structure within a hardware component.

The systems, devices, and modules described in the above embodiments may be implemented by a computer chip or entity, or by a product with a certain function. A typical implementation apparatus is a computer. The computer may be, for example, a personal computer, a laptop computer, an on-board human-machine interaction device, a cellular phone, a camera phone, a smart phone, a personal digital assistant, a media player, a navigation device, an email device, a game console, a tablet computer, a wearable device, or a combination of any of these devices.

Although one or more embodiments of this specification provide method operation steps in the flowcharts, more or fewer operation steps may be included based on actual needs. The sequence of steps in the embodiments is only an example, and does not represent a unique sequence of execution. The steps can be executed sequentially or in parallel according to actual needs (for example, a parallel processor or multi-thread processing environment, or even a distributed data processing environment).

The device embodiments described above are only schematic. For example, the division of the modules may be based on a logical function division. In actual implementations, there may be another division manner. For example, multiple modules or components may be combined or integrated into another system, or some features can be ignored or not implemented. In addition, the coupling or communication connection in the embodiments described above may be indirect coupling or communication connection through some interfaces, devices, or units, and may be in electrical, mechanical, or other forms.

The embodiments are described with reference to flowcharts and/or block diagrams. It should be understood that each flow and/or block in the flowcharts and/or block diagrams and a combination of flows and/or blocks in the flowcharts and/or block diagrams may be implemented by computer program instructions. These computer program instructions can be provided to a processor of a general-purpose computer, a special-purpose computer, an embedded processor, or another programmable data processing device to produce a machine, so that the instructions executed by the processor of the computer or another programmable data processing device produce an apparatus for realizing the functions specified in one or more flows of the flowcharts and/or one or more blocks of the block diagrams.

These computer program instructions may also be stored in a computer-readable memory that can direct a computer or another programmable data processing device to work in a specific manner, so that the instructions stored in this computer-readable memory produce an article of manufacture including an instruction apparatus which implements the functions specified in one or more flows of the flowcharts and/or one or more blocks of the block diagrams.

These computer program instructions can also be loaded onto a computer or another programmable data processing device, so that a series of operation steps are performed on the computer or another programmable device to produce computer-implemented processing, so that the instructions executed on the computer or another programmable device provide steps for implementing the functions specified in one or more flows of the flowcharts and/or one or more blocks of the block diagrams.

Those skilled in the art should understand that one or more embodiments of this specification may be provided as a method, system, or computer program product. Therefore, one or more embodiments of this specification may be in the form of an entirely hardware embodiment, an entirely software embodiment, or an embodiment combining software and hardware aspects. Moreover, one or more embodiments of this specification may be in the form of a computer program product which is implemented on one or more computer-usable storage media (including, but not limited to, disk storage, CD-ROM, optical storage, etc.) containing computer-usable program code.

One or more embodiments of this specification may be described in the general context of computer-executable instructions executed by a computer, such as a program module, Generally, the program module includes a routine, a program, an object, an assembly, a data structure, and the like used for executing a specific task or implementing a specific abstract data type. One or more embodiments of this specification may also be practiced in distributed computing environments in which tasks are performed by remote processing devices connected through a communication network. In the distributed computing environments, the program module may be located in local and remote computer storage media including a storage device.

The above description is only example embodiments of this specification and is not intended to limit this specification. For those skilled in the art, various modifications and changes can be made to one or more embodiments of this specification. Any modifications, equivalent replacements, improvements, etc. made within the spirit and principle of this specification shall be included in the scope of the claims.

The invention claimed is:

1. A post-paid transaction data processing method, comprising:
after receiving a post-paid service request, invoking a risk inquiry interface of a post-paid transaction data processing system, and sending risk search information to a post-paid transaction data processing device via the risk inquiry interface, the risk inquiry interface being a wireless or wired interface;
receiving, by the post-paid transaction data processing device, the risk search information via the risk inquiry interface, the risk search information including a transaction amount and a transaction user identifier of a post-paid transaction;
acquiring, by the post-paid transaction data processing device according to the transaction user identifier, a payment channel corresponding to the transaction user identifier;
determining, by the post-paid transaction data processing device, a predictive affordable value of the payment channel for the transaction amount based on the payment channel and the transaction amount, the predictive affordable value indicating a capacity of the payment channel to pay the transaction amount;
determining, by the post-paid transaction data processing device, a default evaluation result of the post-paid transaction according to the predictive affordable value, wherein determining the default evaluation result of the post-paid transaction comprises:
constructing a default probability prediction model through model training; and
using the default probability prediction model to determine the default evaluation result of the post-paid transaction;
sending, by the post-paid transaction data processing device via a payment interface, the default evaluation result to a post-paid transaction data processing terminal which corresponds to a transaction merchant of the post-paid transaction, the payment interface being a wireless or wired interface; and
receiving, by the post-paid transaction data processing device via the payment interface, request information approving the post-paid transaction, and performing payment processing on the post-paid transaction.

2. The method of claim 1, wherein the risk search information further comprises a commodity type, and the method further comprises:
determining a risk coefficient corresponding to the commodity type; and
determining the default evaluation result of the post-paid transaction according to the risk coefficient and the predictive affordable value.

3. The method of claim 1, wherein determining the predictive affordable value of the payment channel for the transaction amount based on the payment channel and the transaction amount comprises:
acquiring historical bill data of the payment channel;
determining, according to the historical bill data, a predictive amount of funds corresponding to the payment channel at a transaction time; and
determining the predictive affordable value of the payment channel for the transaction amount according to the transaction amount and the predictive amount of funds of the payment channel.

4. The method of claim 3, wherein determining the predictive affordable value of the payment channel for the transaction amount based on the payment channel and the transaction amount further comprises:
acquiring, according to the historical bill data, a transaction behavior of a transaction user corresponding to the payment channel; and
determining the predictive affordable value of the payment channel for the transaction amount according to the transaction behavior, the transaction amount, and the predictive amount of funds of the payment channel.

5. The method of claim 2, wherein determining the risk coefficient corresponding to the commodity type comprises:
acquiring historical transaction data, and acquiring a default transaction ratio corresponding to the commodity type according to the historical transaction data; and
determining the risk coefficient corresponding to the commodity type according to the default transaction ratio.

6. The method of claim 1, wherein determining the default evaluation result of the post-paid transaction according to the predictive affordable value further comprises:
determining the default evaluation result of the post-paid transaction according to the predictive affordable value by using at least one of decision tree and logistic regression.

7. A post-paid transaction data processing system, comprising:
a risk inquiry interface, the risk inquiry interface being a wireless or wired interface;
a payment interface, the payment interface being a wireless or wired interface; and
a post-paid transaction data processing device coupled to the risk inquiry interface and the payment interface, wherein the post-paid transaction data processing device comprises:
a processor; and
a memory storing instructions executable by the processor,
wherein after receiving a post-paid service request, the post-paid transaction data processing system invokes the risk inquiry interface and sends risk search information to the post-paid transaction data processing device via the risk inquiry interface; and
wherein the processor is configured to:
receive the risk search information via the risk inquiry interface, the risk search information including a transaction amount and a transaction user identifier of a post-paid transaction;
acquire, according to the transaction user identifier, a payment channel corresponding to the transaction user identifier;
determine a predictive affordable value of the payment channel for the transaction amount based on the payment channel and the transaction amount, the predictive affordable value indicating a capacity of the payment channel to pay the transaction amount;
determine a default evaluation result of the post-paid transaction according to the predictive affordable value, wherein determining the default evaluation result of the post-paid transaction comprises:
constructing a default probability prediction model through model training; and using the default probability prediction model to determine the default evaluation result of the post-paid transaction;

send, via the payment interface, the default evaluation result to a post-paid transaction data processing terminal which corresponds to a transaction merchant of the post-paid transaction; and receive, via the payment interface, request information approving the post-paid transaction, and perform payment processing on the post-paid transaction.

8. The system of claim 7, wherein the risk search information further comprises a commodity type, and the processor is further configured to:

determine a risk coefficient corresponding to the commodity type; and determine the default evaluation result of the post-paid transaction according to the risk coefficient and the predictive affordable value.

9. The system of claim 7, wherein the processor is further configured to:

acquire historical bill data of the payment channel;

determine, according to the historical bill data, a predictive amount of funds corresponding to the payment channel at a transaction time; and determine the predictive affordable value of the payment channel for the transaction amount according to the predictive amount of funds of the payment channel and the transaction amount.

10. The system of claim 9, wherein the processor is further configured to:

acquire, according to the historical bill data, a transaction behavior of a transaction user corresponding to the payment channel; and determine the predictive affordable value of the payment channel for the transaction amount according to the transaction behavior, the transaction amount, and the predictive amount of funds of the payment channel.

11. The system of claim 8, wherein the processor is further configured to:

acquire historical transaction data, and acquire a default transaction ratio corresponding to the commodity type according to the historical transaction data; and determine a risk coefficient corresponding to the commodity type according to the default transaction ratio.

12. The system of claim 7, wherein the processor is further configured to:

determine the default evaluation result of the post-paid transaction according to the predictive affordable value by using at least one of decision tree and logistic regression.

13. A non-transitory computer-readable storage medium having stored thereon instructions that, when executed by a processor of a post-paid transaction data processing device in a post-paid transaction data processing system, cause the system to perform a post-paid transaction data processing method, wherein the system comprises: a risk inquiry interface, the risk inquiry interface being a wireless or wired interface; a payment interface, the payment interface being a wireless or wired interface; and the post-paid transaction data processing device coupled to the risk inquiry interface and the payment interface, the method comprising:

after receiving a post-paid service request, invoking the risk inquiry interface and sending risk search information to the post-paid transaction data processing device via the risk inquiry interface;

receiving, by the post-paid transaction data processing device, the risk search information via the risk inquiry interface, the risk search information including a transaction amount and a transaction user identifier of a post-paid transaction;

acquiring, by the post-paid transaction data processing device according to the transaction user identifier, a payment channel corresponding to the transaction user identifier;

determining, by the post-paid transaction data processing device, a predictive affordable value of the payment channel for the transaction amount based on the payment channel and the transaction amount, the predictive affordable value indicating a capacity of the payment channel to pay the transaction amount;

determining, by the post-paid transaction data processing device, a default evaluation result of the post-paid transaction according to the predictive affordable value, wherein determining the default evaluation result of the post-paid transaction comprises:

constructing a default probability prediction model through model training; and using the default probability prediction model to determine the default evaluation result of the post-paid transaction;

sending, by the post-paid transaction data processing device via a payment interface, the default evaluation result to a post-paid transaction data processing terminal which corresponds to a transaction merchant of the post-paid transaction, the payment interface being a wireless or wired interface; and receiving, by the post-paid transaction data processing device via the payment interface, request information approving the post-paid transaction, and performing payment processing on the post-paid transaction.

* * * * *